Patented Mar. 13, 1923.

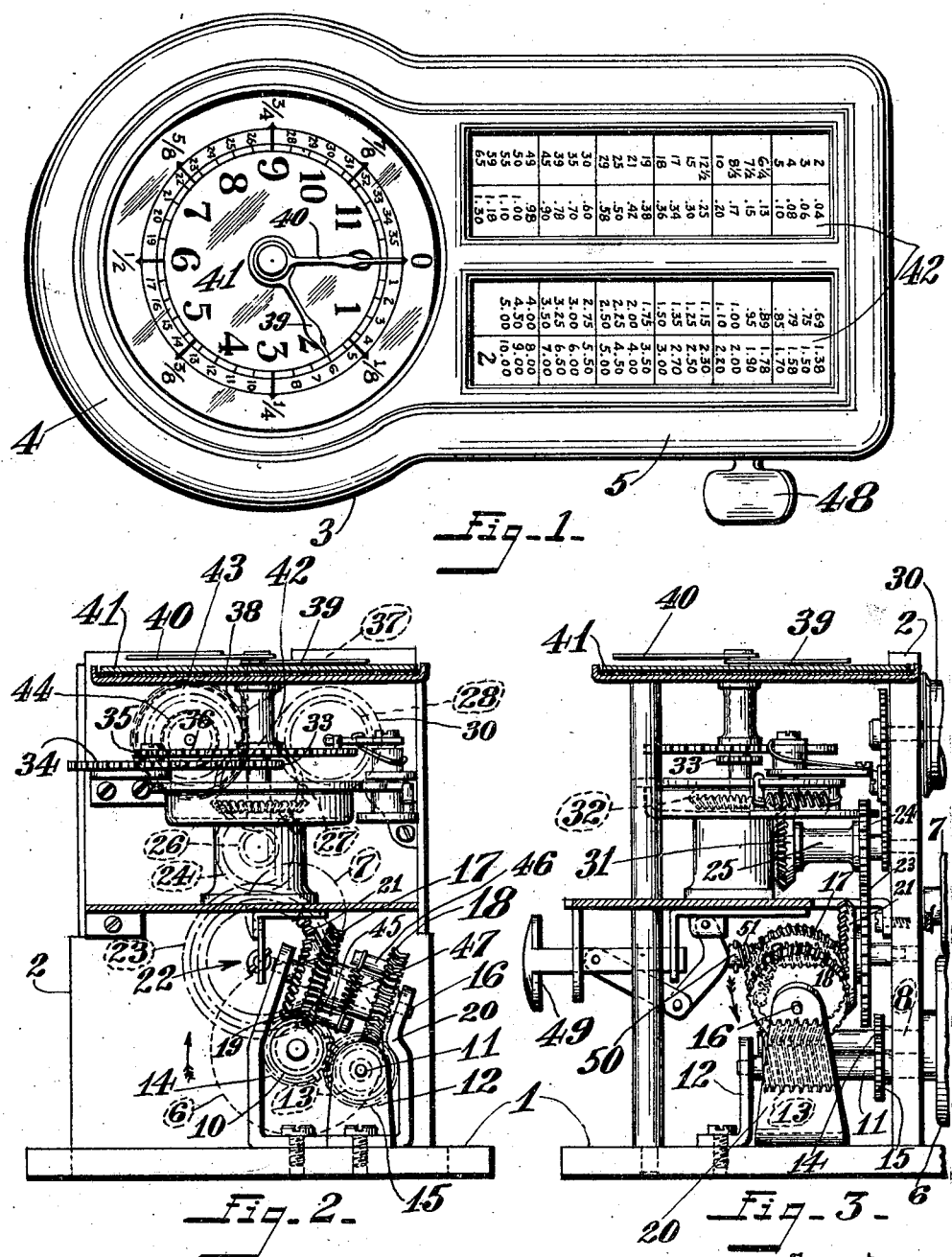

1,448,369

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF DELAWARE.

FABRIC MEASURING AND COST-INDICATING MACHINE.

Application filed September 8, 1919. Serial No. 322,391.

*To all whom it may concern:*

Be it known that I, DOUGLAS TURNER, a citizen of the United States, residing at St. Louis, in the State of Missouri, have invented certain new and useful Improvements in Fabric Measuring and Cost-Indicating Machines, of which the following is a specification.

My invention relates to improvements in indicating machines and is particularly applicable to fabric measuring and cost indicating machines.

Machines of this character usually include a measuring roll over which the fabric is drawn in being measured. The rotation of the measuring roll is communicated to indicating mechanism which indicates the length of the fabric measured and the cost of the same. During such measurement the fabric is held in frictional engagement with the measuring roll by a pressure roll, usually mounted above the measuring roll, and held against the same by a spring to provide a yielding pressure.

As hereinafter explained more fully, the price indicating mechanism includes a helical spring, the tension of which is increased as the material is being drawn between the rollers. This spring tends therefore to restore the parts to initial position, resulting in a substantial drag on the moving parts sufficient under some circumstances to run the entire mechanism backward prematurely.

One of the objects of the present invention is to provide a train of gearing which is locked against backward rotation except when driven by the measuring roll. Another object of the invention is to provide means for preventing backlash in said train of gearing, thereby avoiding errors which would otherwise be introduced in the measurement when the operator moves the goods back and forth toward the end of the measurement to obtain an exact reading of the length indicator. A further object is to provide an improved mechanical movement.

The invention consists in the novel features, and in the general combination of parts to be particularly described hereinafter, all of which contribute to produce a simple and efficient fabric measuring and cost indicating machine. A preferred embodiment of my invention will be particularly described in the following specification, while the broad scope of my invention will be pointed out in the appended claims.

In the accompanying drawings I have illustrated one embodiment of the invention.

Fig. 1 is a top plan view of the machine;

Fig. 2 is a rear elevation thereof, with the casing removed; and

Fig. 3 is a fragmentary side elevation thereof.

According to my invention I provide forward driving gearing for driving the indicating means in a forward direction from the measuring roll and I provide rearward driving gearing for driving the indicating means in a rearward direction from the measuring roll, and in combination with these two driving gears I provide means for preventing backlash when driving through either of them.

In many types of indicating machines a spring is connected with the indicating means for returning the same to zero after an indicating movement. In machines where there is not a great reduction in the movement from the driving member, in other words, where there is a small amount of "back-gearing," sometimes there is a tendency for the spring to start a return movement if the operator ceases to apply force to the measuring roller. In order to prevent such a contingency I prefer to provide the forward driving gearing with a one-way driving device which prevents any possibility of a force, such as a return spring, applied at the indicating means, from driving the mechanism in a rearward direction, and if desired a similar one-way driving device may be included in the rearward driving gearing.

The machine comprises a frame composed of a base plate 1 on which is mounted a vertical plate 2, said plate and the mechanism supported thereby being enclosed within a suitable casing 3. Said casing comprises a cylindrical portion 4 in which is mounted the length indicating means, and a rectangular front portion 5 housing the price indicating means.

The fabric to be measured is drawn between a measuring roll 6 and a pressure roll 7 yieldingly held against the same by means not shown herein. Such measuring roll is secured to shaft 8 passing through the plate 2 and turning in suitable bearings. Any suitable one-way driving device may be provided. This one-way driving effect may be accomplished in a simple manner by the use of a worm in each of the driving gears. In order to accomplish this the shaft 8 carries at its end a worm 10 called herein a left-hand worm. An auxiliary shaft 11 is mounted in a position parallel to the shaft 8, and turns in suitable bearings in the vertical plate 2 and in the bracket 12. Said shaft carries a right hand worm 13. Spur gears 14, 15, are mounted on the measuring roll shaft 8 and auxiliary shaft 11 respectively whereby the right hand worm is driven from said measuring roll, as well as said left hand worm. A second shaft 16 is disposed at right angles to the shafts 8 and 11, and carries worm wheels 17, 18, said worm wheels being in mesh with the worms 10 and 13 respectively. The worm wheel 17 has attached to it a miter gear 19 constituting one of a pair. Said worm wheels are mounted on separate hubs and turn loosely on the shaft 16. As the worms are of opposite pitch they rotate their worm-wheels in the same direction. A bracket 20 supports said shaft at its ends in such position that the worms and worm wheels will mesh properly.

Motion is transmitted from the measuring roll 6 to the worm 10, worm wheel 17, and miter gear 19, thence to a second miter gear 21 and through the friction clutch 22 to the large gear 23, which is in mesh with the pinion 24 mounted on a hub 25. Motion from this point is transmitted both to the length indicating and price indicating devices. Motion to the price indicating device is transmitted by gears 26, 27 and 28 to the price indicating cylinder 30. Motion is also transmitted through the miter gears 31, 32, to a suitable gearing train 33, 34, 35, 36, said gearing providing for the rotation of the vertical spindle 37 and a concentric sleeve 38, at the upper end of which are mounted pointers 39 and 40.

Said pointers rotate over a suitable dial 41 in a manner which is well understood, the arrangement resembling the face of a clock. The fast moving pointer indicates inches and fractions of a yard, and the slow moving pointer indicates yards. One pointer rotates twelve times during a single rotation of the other pointer.

The price indicating means consists of a chart 42 printed on both sides indicating the total charge at various prices per yard. This chart as it winds onto the roller 30 is unwound from a second roller 43. Said roller contains a helical spring 44, the tension of which is increased as the chart is unwound from one roller and wound onto the other roller. Said spring therefore exerts a pull tending to restore the parts to initial position. Some difficulty has been encountered heretofore due to the pull of this spring, which sometimes resulted in premature backward rotation of the parts. Under the present construction such backward rotation is prevented by the worm and gear mechanism constituting part of the train of gearing, which mechanism is not reversible. As a result the measuring roll is locked against movement unless the movement is imparted to it by the operator in drawing the cloth back and forth between the rolls.

It is essential in a machine of this character that the measurement be very accurate, and it is therefore necessary to eliminate the error due to backlash in the train of gearing. As long as the operator draws the cloth in one direction, backlash is ineffective, but if toward the end of the measurement, the operator draws the cloth back and forth in order to bring one of the pointers to an exact reading, an error may be introduced due to backlash.

In order to overcome this difficulty, the two worms and gears are employed instead of a single worm and gear, this duplicate gearing being connected in the following manner: Pins 45, 46, are secured to the sides of the worm wheels 17, 18, projecting inwardly as shown in Fig. 2. Said pins are connected by a coil spring 47. Said spring tends to hold the worm wheels 17, 18, with the sides of their teeth always in contact with the working faces of the threads of their respective worms. When the machine is driven forward during the ordinary measuring operation, the measuring roll 6 rotates in a clockwise direction as shown by the arrow in Fig. 2, communicating motion to the worm 10, which, being left handed, causes the worm wheel 17 to rotate in an anti-clockwise direction, as shown by the arrow in Fig. 3. By means of the gears 14, 15, the auxiliary shaft 11 is caused to rotate in a direction opposite to that of the measuring roll shaft 8. The worm 13, however, being right handed, the worm wheel 18 is rotated in the same direction as the worm wheel 17 and at the same speed, the pins on said worm wheels being drawn toward each other, as far as permitted by the backlash, by the spring 47. When the machine is operated in a reverse direction, the motion is transmitted from the measuring roll shaft 8 through the gears 14, 15, worm 13 and worm wheel 18 and through spring 47 to the miter gear 19 and on through the remainder of the gear train in the manner previously described. The motion is thus transmitted to said remaining gear train without lost motion when the measuring roll is rotated backward or forward.

After the measuring operation has been completed, the operator notches or marks the goods by depressing the button 48, thereby operating a knife (not shown) and separating the rolls 6, 7. After the cloth is removed from the machine, the operator depresses a resetting button 49, thereby moving inwardly the shaft 50 against the action of a spring 51, thus separating the members of the clutch 22, the details of which are not shown herein, said clutch serving to cause the engagement and disengagement of the miter gear 21 and the adjacent gear 23. After these gears have been disengaged, the helical spring 44 restores the length indicating and price indicating means to initial position.

It is understood that the embodiment of the invention described herein is only one of the many embodiments my invention may take, and I do not wish to be limited in the practice of my invention nor in my claims to the particular embodiment set forth.

I claim as my invention:

1. In a machine of the kind described, the combination of a measuring roll, indicating means, forward driving gearing for driving the indicating means in a forward direction from the measuring roll, rearward driving gearing for driving the indicating means in a rearward direction from the measuring roll, and means for preventing backlash when driving through the forward driving gearing and when driving through the rearward driving gearing.

2. In a machine of the kind described, the combination of a measuring roll, indicating means, forward driving gearing for driving the indicating means in a forward direction from the measuring roll, rearward driving gearing for driving the indicating means in a rearward direction from the measuring roll, and a spring connecting a part of the forward driving gearing with a part of the rearward driving gearing and operating to prevent backlash when driving through either the forward driving gearing or the rearward driving gearing.

3. In a machine of the kind described, the combination of a measuring roll, indicating means, a clutch through which the same is driven, a spring associated with the indicating means and operating to return the same to zero after an indicating movement, forward driving gearing for driving the indicating means in a forward direction from the measuring roll, said driving gearing including a one-way driving device operating to prevent said spring from returning the indicating means to zero, rearward driving gearing for driving the indicating means in a rearward direction from the measuring roll, and means for preventing backlash when driving through the forward driving gearing and when driving through the rearward driving gearing.

4. In a machine of the kind described, the combination of a measuring roll, indicating means, forward driving gearing including a one-way driving device for driving the indicating means in a forward direction, said one-way driving device operating to prevent a rearward movement of the indicating means by a force applied at the indicating means, rearward driving gearing for driving the indicating means in a rearward direction from the measuring roll, and means for preventing backlash when driving through the forward driving gearing and when driving through the rearward driving gearing.

5. In a machine of the class described, the combination of a measuring roll, length and price indicating means, gearing connecting said measuring roll and said length and price indicating means including a worm gear and resilient means for preventing lost motion in said worm, and means for returning said length and price indicating means to zero position.

6. In a machine of the class described, the combination of a measuring roll, length and price indicating means, gearing connecting said measuring roll and price and length indicating means, and acting to prevent movement except when driven by said measuring roll, and manually controlled means for returning said length and price indicating means to zero position.

7. In a machine of the class described, the combination of a measuring roll, length and price indicating means, gearing connecting said measuring roll and said length and price indicating means including a worm arranged to be driven by said measuring roll, an auxiliary shaft having a second worm driven from said first named shaft, said worm and shaft being mounted adjacent said first named worm, worm wheels meshing with said worms, and a spring connection between said worm wheels.

8. In a machine of the class described, the combination of a measuring roll, length and price indicating means, a train of gearing connecting said measuring roll and length and price indicating means, said gearing train including two separated parts each directly connected in the train, one of said parts operating to transmit rotation of said measuring roller in one direction and the other operating to transmit rotation of the measuring roller in the other direction, and means for drawing the two parts in opposite directions to prevent backlash in the drive through each of the same.

9. A mechanical movement comprising a driving element, a driven element, a pair of worms and gears adapted to communicate motion from said driving element and said driven element, said gears rotating in the same direction, and means for drawing one gear forwardly and the other backwardly with reference to the direction of rotation to the full extent permitted by the backlash of the train of gearing.

10. A mechanical movement comprising a right handed worm and gear, a left handed worm and gear, a pair of spur gears connecting said worms thereby rotating said gears in the same direction, and a spring connected at opposite ends to each gear, said connections being one in advance of the other to draw said gears toward each other.

In testimony whereof, I have subscribed my name.

DOUGLAS TURNER.